US011265118B2

(12) United States Patent
Sturkovich (10) Patent No.: US 11,265,118 B2
(45) Date of Patent: Mar. 1, 2022

(54) SPECTRUM ANALYZER INTEGRATED IN A POINT-TO-POINT OUTDOOR UNIT

(71) Applicant: MAXLINEAR ASIA SINGAPORE PRIVATE LIMITED, Singapore (SG)

(72) Inventor: Yaacov Sturkovich, Netanya (IL)

(73) Assignee: MAXLINEAR ASIA SINGAPORE PRIVATE LIMITED, Singapore (SG)

( * ) Notice: Subject to any disclaimer, the term of this patent is extended or adjusted under 35 U.S.C. 154(b) by 782 days.

(21) Appl. No.: 13/932,177

(22) Filed: Jul. 1, 2013

(65) Prior Publication Data

US 2015/0003507 A1 Jan. 1, 2015

Related U.S. Application Data

(60) Provisional application No. 61/839,539, filed on Jun. 26, 2013.

(51) Int. Cl.
*H04L 1/20* (2006.01)
*H04B 1/04* (2006.01)
*H04B 1/10* (2006.01)
*H04L 25/03* (2006.01)

(52) U.S. Cl.
CPC ...... *H04L 1/206* (2013.01); *H04B 2001/0425* (2013.01); *H04B 2001/1045* (2013.01); *H04L 25/03343* (2013.01)

(58) Field of Classification Search
CPC .............................. H04W 16/14; H04W 24/00
USPC ..................... 455/63.1, 67.13, 67.15, 62, 454
See application file for complete search history.

(56) References Cited

U.S. PATENT DOCUMENTS

| 3,645,132 | A | * | 2/1972 | Rasmussen | G01F 1/3245 73/170.11 |
|---|---|---|---|---|---|
| 5,630,212 | A | * | 5/1997 | Ben-Efraim | H04B 1/38 455/11.1 |
| 2002/0163979 | A1 | * | 11/2002 | Takatz | H03G 3/3052 375/345 |
| 2003/0198304 | A1 | * | 10/2003 | Sugar et al. | 375/340 |
| 2003/0203743 | A1 | * | 10/2003 | Sugar et al. | 455/550.1 |
| 2006/0222116 | A1 | * | 10/2006 | Hughes | H03G 1/0088 375/345 |
| 2008/0309405 | A1 | * | 12/2008 | Young et al. | 330/149 |
| 2011/0075745 | A1 | * | 3/2011 | Kleider | H04L 25/03057 375/260 |
| 2011/0090939 | A1 | * | 4/2011 | Diener et al. | 375/136 |
| 2011/0137166 | A1 | * | 6/2011 | Klee | A61B 8/4281 600/437 |

(Continued)

OTHER PUBLICATIONS

U.S. Appl. No. 60/319,434.*

(Continued)

*Primary Examiner* — Gennadiy Tsvey
(74) *Attorney, Agent, or Firm* — Maschoff Brennan (57) ABSTRACT

A fully functional spectrum analyzer is integrated into an outdoor communications unit of a point-to-point communication system. The spectrum analyzer of the outdoor unit provides for remote spectral diagnostics for network planning and wideband operation and is operable to capture signals outside of the signal bandwidth. With the spectrum analyzer integrated into the outdoor unit, accessing spectral diagnostic information is conducted without having to disrupt the normal operation of the communications network.

18 Claims, 6 Drawing Sheets

(56) References Cited

U.S. PATENT DOCUMENTS

| | | | | |
|---|---|---|---|---|
| 2011/0158303 A1* | 6/2011 | Gauthier | ........... | H04W 52/0283 |
| | | | | 375/224 |
| 2012/0315990 A1* | 12/2012 | Albrektsson | ............ | A63F 3/069 |
| | | | | 463/40 |
| 2013/0045705 A1* | 2/2013 | Kapoor | ................ | H04B 1/1036 |
| | | | | 455/307 |
| 2013/0084821 A1* | 4/2013 | Kapoor et al. | ................ | 455/307 |
| 2013/0102267 A1* | 4/2013 | Haub | ....................... | H04B 1/10 |
| | | | | 455/296 |
| 2013/0156140 A1* | 6/2013 | Chari | ................... | H03G 3/3068 |
| | | | | 375/345 |
| 2014/0139286 A1* | 5/2014 | Laporte | ................ | H03F 1/3247 |
| | | | | 330/149 |
| 2014/0171001 A1* | 6/2014 | Fernando | ............... | H04B 17/21 |
| | | | | 455/226.1 |
| 2018/0361469 A1* | 12/2018 | Nooning, Jr | ......... | B22D 11/168 |
| 2019/0109748 A1* | 4/2019 | Gokceli | .............. | H04L 27/2628 |
| 2019/0150783 A1* | 5/2019 | Xue | ...................... | G01R 33/341 |
| 2019/0209026 A1* | 7/2019 | Han | ..................... | A61B 5/4848 |

OTHER PUBLICATIONS

Comprehensive Reference on Semiconductor Manufacturing EESEMI, retrieved from htttps://www.eesemi.com/dsp.htm on Dec. 20, 2019 (Year: 2019).*

Digital Signal Processors (DSPs) Definition—Critical Link, retrieved from https://www.criticallink.com/digital-signal-processor on Dec. 20, 2019 (Year: 2019).*

Analog Devices's a Beginner's Guide to Digital Signal Processing (DSP), retrieved from https://www.analog.com/en/design-center/landing-pages/001/beginners-guide-to-dsp.html# on Dec. 20, 2019 (Year: 2019).*

* cited by examiner

SPECTRUM ANALYZER INTEGRATED IN A POINT-TO-POINT OUTDOOR UNIT

CROSS REFERENCE TO PRIORITY APPLICATIONS/INCORPORATION BY REFERENCE

The present U.S. Utility Patent Application claims priority pursuant to 35 U.S.C. § 119(e) to U.S. Provisional Patent Application Ser. No. 61/839,539, entitled "Spectrum Analyzer Integrated in a Point-to-Point Outdoor Unit" filed Jun. 26, 2013, which is hereby incorporated herein by reference in its entirety and made part of the present U.S. Utility Patent Application for all purposes.

BACKGROUND

Technical Field

The present disclosure described herein relates generally to communication interference reduction and more particularly to interference reduction in point-to-point (P2P) communications.

Description of Related Art

Depending on the type of wireless communication system, a wireless communication device, such as a cellular telephone, two-way radio, personal digital assistant (PDA), personal computer (PC), laptop computer, home entertainment equipment, and other equivalents communicate directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s).

Microwave technology is frequently used for point-to-point communications. Microwaves are especially suitable for this use since they are more easily focused into narrow beams than radio waves, have comparatively higher frequencies which allow broad bandwidth and high data flow, and also may have smaller antennas.

DETAILED DESCRIPTION

In one or more embodiments of the technology described herein, a circuit and system is provided for an outdoor communications unit having an integrated spectrum analyzer.

Point-to-point communication networks provide for direct wireless data communications via radio frequencies (RF) or optical means (i.e., lasers). One element of P2P communication networks is that the transmission medium uses line of sight between the transmitter(s) and the receiver(s) of the members of the P2P network. In a typical P2P network, data is transmitted by a transmitter to at least one receiver. Disruptions in the connection between transmitter(s) and receiver(s) are often caused by out-of-band interferers.

Recently, due to increasing bandwidth and data requirements, point-to-point (P2P) communication networks have evolved to use microwaves. Microwaves are radio waves with wavelengths ranging from as long as one meter to as short as one millimeter, or equivalently, with frequencies between 300 MHz (0.3 GHz) and 300+GHz. This broad definition includes both UHF (ultra high frequency) and EHF (extremely high frequency), and various sources use different boundaries. In all cases, microwave includes at least the entire SHF (super high frequency) band (e.g., 3 to 30 GHz, or 10 to 1 cm) at minimum, with RF engineering often putting the lower boundary at 1 GHz (30 cm), and the upper around 100 GHz (3 mm).

Traditional P2P systems operate continuously at 99.999% availability. During normal operation there is no visibility out of the signal bandwidth from a spectrum presentation perspective. However, having continuous or as-needed information about out-of-band interferers would assist with (1) failure diagnostics when they may introduce performance degradation of an associated link (2) link planning and (3) reducing technical team site radio surveys.

Diagnostic evaluation of out-of-band interferers is useful for maintaining operability as well as for connection planning. Point-to-point network diagnostic evaluations are performed by technical personnel through onsite visits. During these onsite visits, technical personnel (e.g., network operators) terminate the problematic P2P transmission and connect spectrum analyzing equipment to perform a diagnostic evaluation. Alternatively, separate spectrum analyzing equipment is sometimes coupled to the existing wired infrastructure on the inside of the building, but this significantly increases the costs and is not often used. A spectrum analyzer is a diagnostic tool for measuring the characteristics of a signal. For example, spectrum analyzers are often used to measure the dominant frequency, power, distortion, harmonics, bandwidth, and other spectral components of a signal. These parameters are useful in the characterization of a communications device.

In one embodiment of the technology described herein, a circuit and system is provided for a spectrum analyzer integrated into an outdoor (e.g., attached to a building, house, office, etc.) communications unit for installation as a node.

Figure 1:
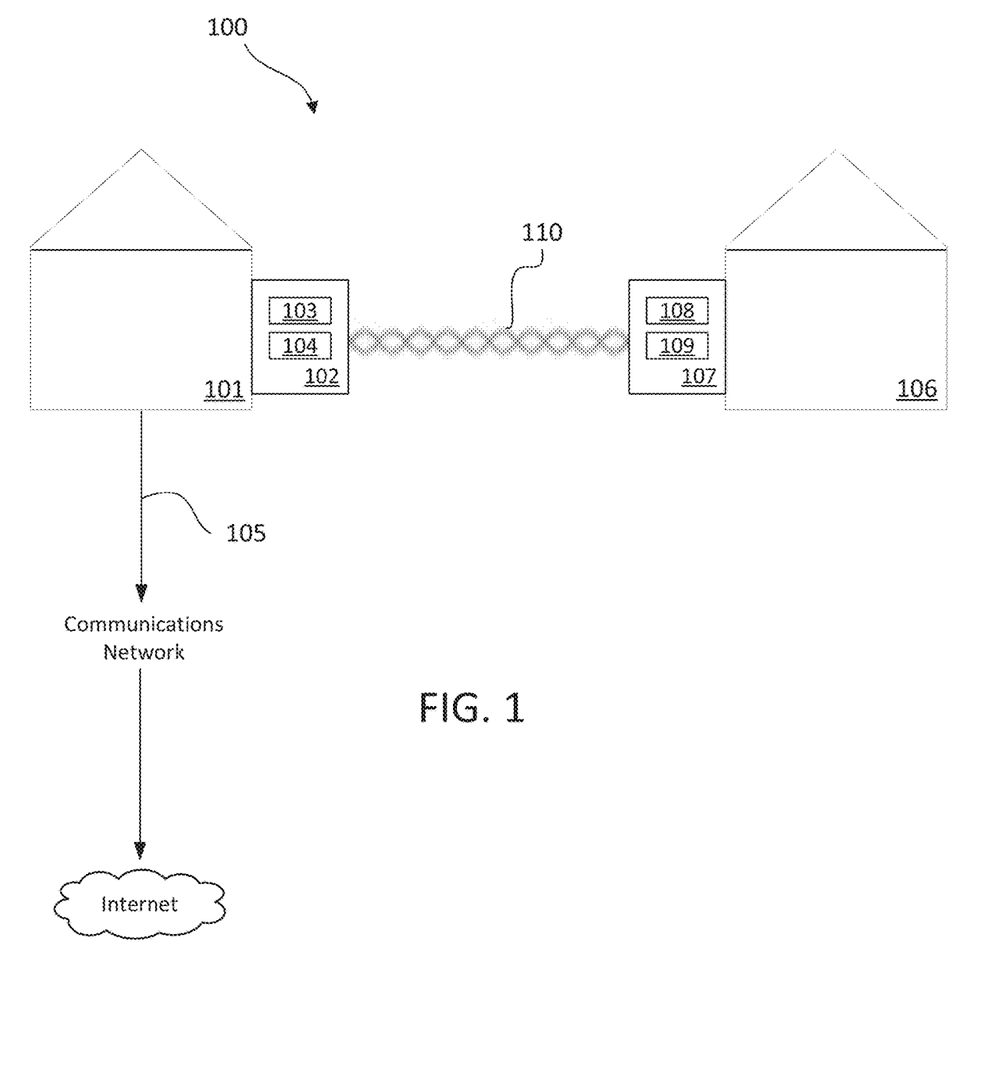
FIG. 1 is a diagram illustrating a communications network embodiment in accordance with the present disclosure.

FIG. 1 is a diagram illustrating a communications network embodiment in accordance with the present disclosure. Communications system 100 provides for a direct P2P network between building 101 and building 106. Building 101, in one embodiment, is connected (communications equipment) with a communications network through wired connection 105 (e.g., fiber optic, cable, telephone). In one embodiment, the communications network is a telephone communications network in connection with an Internet service provider (ISP) providing an Internet source. In an alternative embodiment, building 101 is in connection with a telephone communications network through a wireless connection (not shown). A P2P connection provides for a communications link 110 between communications equipment located at building 101 and building 106. Communications link 110, for example, is a wireless microwave connection; however other communications frequencies such as radio frequencies (RF) below microwave frequencies are within scope of the technology described herein.

In one embodiment, communications link 110 is created by outdoor point-to-point (P2P) wireless communication units 102 and 107, located external to buildings 101 and 106, respectively. Wireless communication units 102 and 107 further include transceivers 103 and 108. Transceivers 103 and 108 include both a transmitter and receiver and one or more connected antennas. Integrated into at least one of the transceivers is an integrated spectrum analyzer shown as 104 for communication unit 102 and 109 for communication unit 107. Integrated spectrum analyzers 104 and 109 provide for digital capturing of diagnostic information for communications link 110. By placing integrated spectrum analyzers 104 and 109 in the outdoor point-to-point communications units, digital diagnostic information about out-of-band interferers is readily available to network operators (e.g., through connection to telephone communications network/Internet—line 105). Network operators will greatly reduce or eliminate personnel site visits as the need to manually connect spectrum analyzing equipment is eliminated. Additionally, because the spectrum analyzers are permanently affixed to the communication infrastructure, there is no need for the technical personnel to stop transmissions associated with communications link 110 during diagnostic evaluations.

Figure 2:
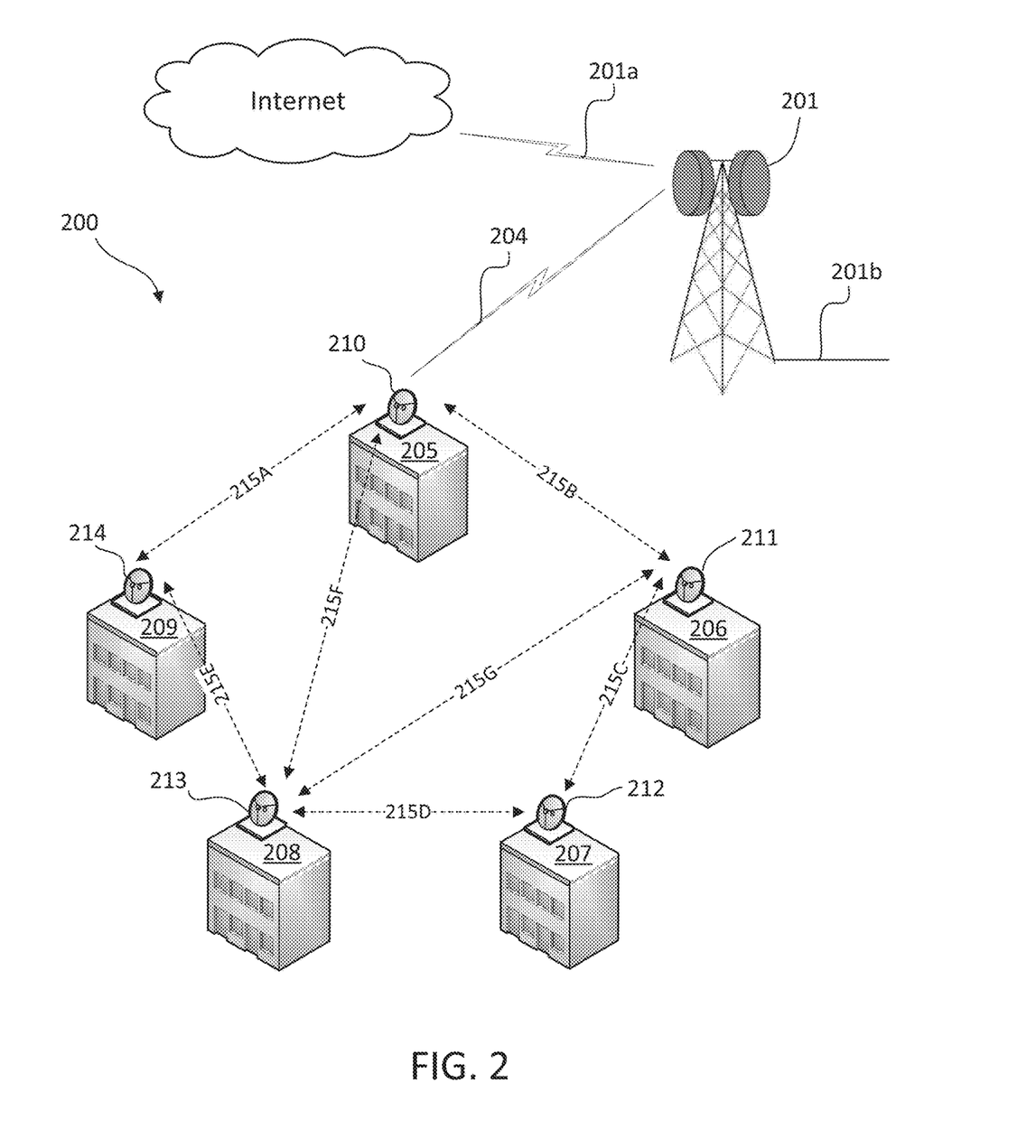
FIG. 2 is a point-to-point communications network illustrating one embodiment in accordance with the present disclosure.

FIG. 2 is a point-to-point communications network illustrating one embodiment in accordance with the present disclosure. As shown, a P2P network is established between node 210 (building 205) and nodes 211, 212, 213 and 214 (buildings 206, 207, 208 and 209, respectively). In the P2P network, each node is a member of the P2P network and communicates directly with other members of the P2P network. In a microwave embodiment, nodes of the P2P communications network include a microwave antenna with a transceiver and an integrated spectrum analyzer (as shown in the 2-building embodiment of FIG. 1).

Node 210, in communication with node 201, shares connection resources with nodes 211-214 through P2P connections 215A through 215G. Although only connections 215A through 215G are shown, each node of the P2P network is capable of communication connections with any other node in the P2P network. Point-to-point communications network 200 is, in one embodiment, wirelessly connected to node 201, such as a microwave tower which includes at least a microwave communications transceiver for communicating data to/from (204) point-to-point node 210 as well as to/from (201*a*) a remote communications network in connection with an ISP for providing an Internet source. In one embodiment, node 201 simply acts as a relay for communication signals 204. In another embodiment, node 201 (e.g., E-UTRAN Node B (eNB)) includes a base station to support communications to/from the tower (201*a* and 204). In yet another embodiment, any of the nodes (201, 210-214) includes a wired connection 201*b* (e.g., fiber optic, cable, telephone) to a remote communications network (not shown) in connection with an ISP for providing an Internet source.

As previously discussed, line of sight is used for nodes to communicate in a P2P network. Due to the line of sight requirement, out-of-band interferers often present issues in maintaining network availability.

In one embodiment of the technology described herein, a fully functional integrated spectrum analyzer for an outdoor point-to-point communications unit is provided. The outdoor point-to-point communications unit includes a direct-conversion receiver (DCR) having a wideband receiving path until the signal reaches a baseband filter. A DCR, also known as homodyne, synchrodyne, or zero-IF (intermediate frequency) receiver, is a radio receiver design that demodulates the incoming radio signal using synchronous detection driven by a local oscillator whose frequency is identical to, or very close to the carrier frequency of the intended signal. This configuration eliminates the need for low bandwidth ceramic filters at high IF that is typical for super heterodyne architectures.

Figure 3:
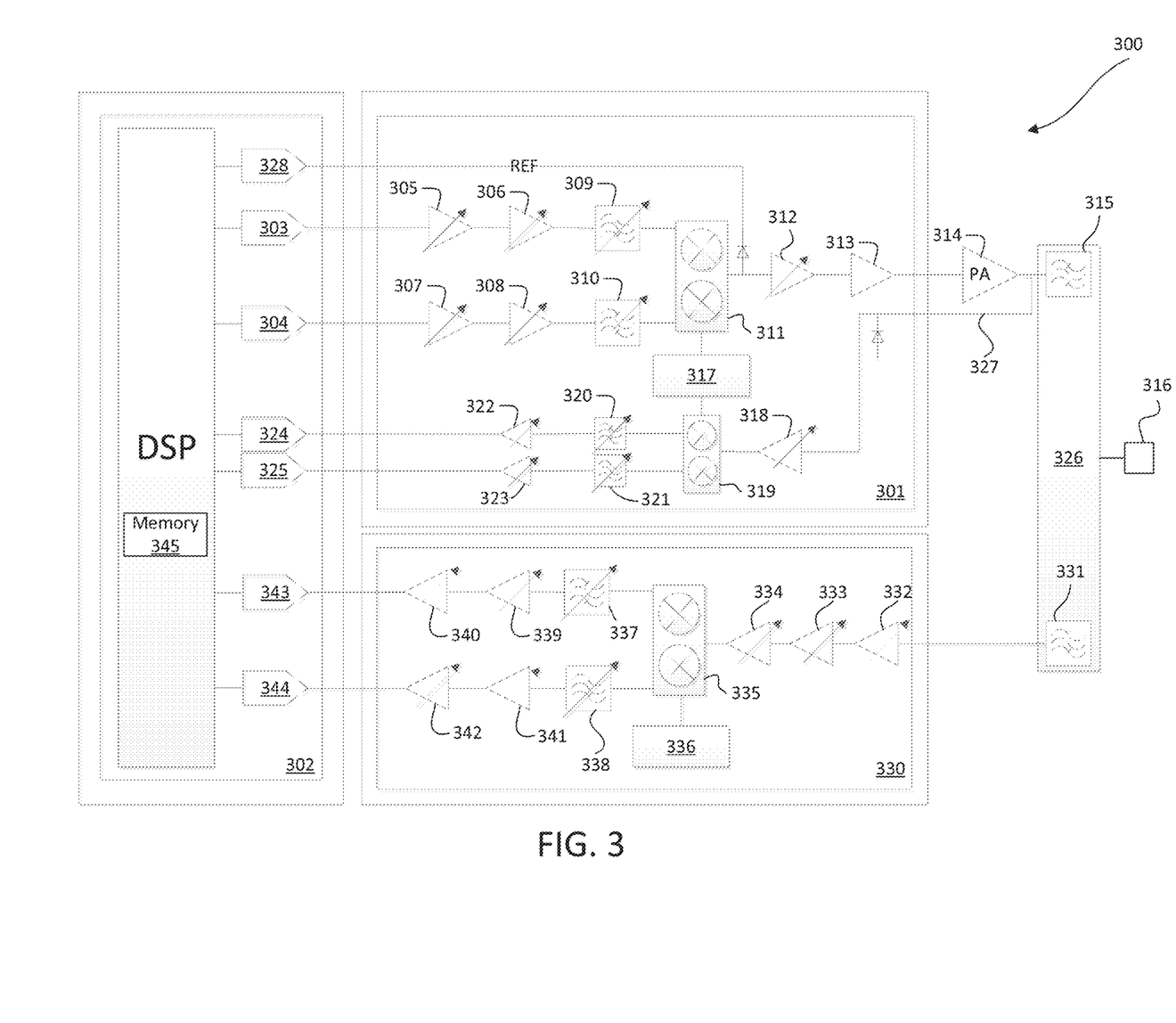
FIG. 3 is an outdoor communications unit diagram illustrating one embodiment in accordance with the present disclosure.

FIG. 3 is an outdoor communications unit diagram illustrating one embodiment in accordance with the present disclosure. Outdoor point-to-point communications unit 300 includes an integrated spectrum analyzer with digital signal processor (DSP) 302. Transmitter 301 generates communications signals to be transmitted by one or more antennas 316 between nodes in a P2P network. Communication signals received by the digital signal processor (DSP) (e.g., from inside the premises/building) are processed along two processing chains (paths). The communication signals are first converted from a digital signal to an analog signal via a first set of digital-to-analog converters (DACs) 303 and 304. The converted signals are amplified by variable amplifiers 305 and 306 in the first processing chain and by variable amplifiers 307 and 308 in the second processing chain. The amplified signals are filtered through low-pass filters 309 and 310, respectively. Mixer 311, coupled with synthesizer 317 providing a specific oscillation frequency, upconverts the signals from baseband to a desired transmission frequency signal. The up-converted signal is passed back to digital signal processor 302 through DAC 328 as a pre-amplified reference signal (REF) as well as passed through variable amplifier 312, amplifier 313 and power amplifier (PA) 314. The transmission signal passes through low-pass filter 315 of diplexer 326 and is transmitted through antenna 316.

A feedback path 327 is provided in transmitter 301 where the communication signal at the output of power amplifier 314 is fed back into the DSP through a second set of processing chains to correct for amplifier distortion. Signal distortion is often caused by amplification of an input signal by an amplifier. The linear input signal is compressed by the amplifier creating a non-linear output signal having the potential to overlap with other adjacent frequencies causing distortion. By implementing a feedback path after the amplification of the transmission signal, non-linearities in the transmitted signals are discovered and reduced.

Feedback path 327 provides a pre-distortion signal for transmitter 301 by coupling the amplified signal output from power amplifier 314 through variable amplifier 318 to mixer 319, connected to synthesizer 317, where the signal is down-converted (e.g., to baseband) and split into two signal processing chains. The signals are passed through low-pass filters 320 and 321 to variable amplifiers 322 and 323, respectively. The signals are digitized by a second set of ADC converters (324 and 325) and processed by DSP 302 to compare them to the reference signal (REF) output signal. Variances in the signals are identified and errors (typically attributable to the PA) between the input and output signals are minimized by an adaptive digital pre-distortion correction which adapts for any PA. In another embodiment, the feedback is also used for other applications including built-in self-tests.

Outdoor point-to-point communications unit 300 further includes receiver 330 for receiving communications signals from other nodes in the P2P network. Other node transmissions are received by outdoor point-to-point communications unit 300 through antenna 316 coupled to receiver 330. Antenna 316 receives the communications signals and passes them through wide band low-pass filter 331 of diplexer 326. The filtered signals are passed to a series of variable amplifiers 332-334 and then to mixer 335, coupled to synthesizer 336, for down-conversion of the received signal to lower frequency signals (e.g., baseband). The down-converted signals are passed from the mixer through two processing chains. A first processing chain includes baseband low-pass filter 337 and a pair of variable amplifiers 339 and 340. A second processing chain includes baseband low-pass filter 338 and a pair of variable amplifiers 341 and 342. The amplified signals are passed from receiver 330 through a third set of converters (343 and 344) that are coupled to the DSP. This architecture provides for signal bandwidth that is limited only by baseband low-pass filters. In one embodiment, the low-pass filters are configured to be wide band (beyond the desired operational bandwidth) making the receiver sensitive to out-of-band interferers as they are not filtered by analog filters. For example, low-pass filters are configured up to 600 MHz while operational signal bandwidth is up to 112 MHz. In one embodiment, the architecture provides for a high converter sampling rate (e.g., operating at 1.35 GHz) allowing the converters to capture and save wide spectral information into memory 345 for presentation to a remote network operator without interrupting normal operation.

Figure 4:
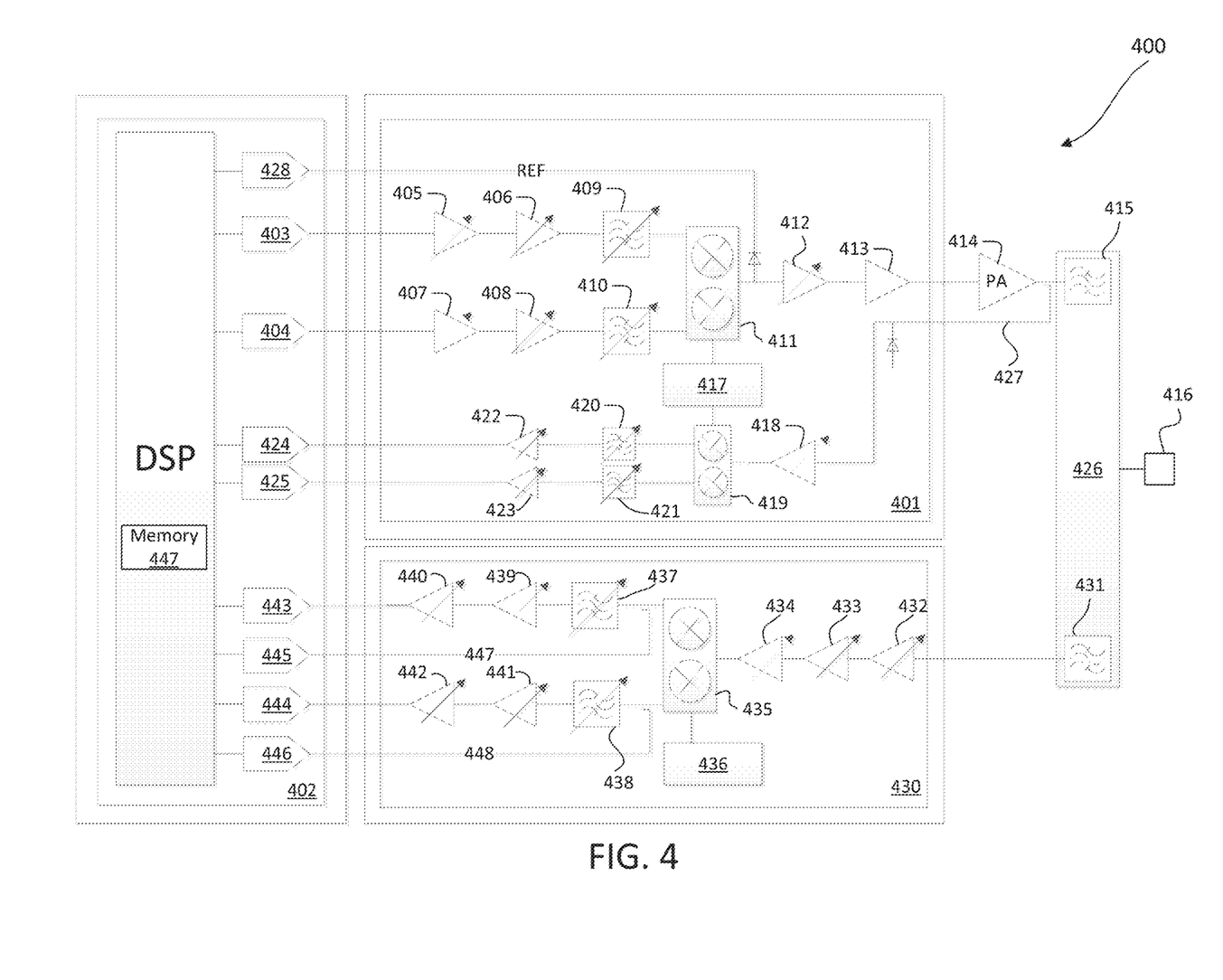
FIG. 4 is an outdoor communications unit diagram illustrating another embodiment in accordance with the present disclosure.

FIG. 4 is an outdoor communications unit diagram illustrating another embodiment in accordance with the present disclosure. Outdoor point-to-point communications unit 400 includes an integrated spectrum analyzer with digital signal processor (DSP) 402. Transmitter 401 generates communications signals to be transmitted by one or more antennas 416 between nodes in a P2P network. Communication signals received by digital signal processor (DSP) (e.g., from inside the premises/building) are processed along two processing chains (paths). The communication signals are first converted from a digital signal to an analog signal via a first set of digital-to-analog converters (DACs) 403 and 404. The converted signals are amplified by variable amplifiers 405 and 406 in the first processing chain and by variable amplifiers 407 and 408 in the second processing chain. The amplified signals are filtered through low-pass filters 409 and 410, respectively. Mixer 411, coupled with synthesizer 417 providing a specific oscillation frequency, upconverts the signals from baseband to a desired transmission frequency signal. The up-converted signal is passed back to digital signal processor 402 through DAC 428 as a pre-amplified reference signal (REF) as well as passed through variable amplifier 412, amplifier 413 and power amplifier (PA) 414. The transmission signal passes through low-pass filter 415 of diplexer 426 and is transmitted through antenna 416.

A feedback path 427 is provided in transmitter 401 where the communication signal at the output of power amplifier 414 is fed back into the DSP through a second set of processing chains to correct for amplifier distortion. Signal distortion is often caused by amplification of an input signal by an amplifier. The linear input signal is compressed by the amplifier creating a non-linear output signal having the potential to overlap with other adjacent frequencies causing distortion. By implementing a feedback path after the amplification of the transmission signal, non-linearities in the transmitted signals are discovered and reduced.

Feedback path 427 provides a pre-distortion signal for transmitter 401 by coupling the amplified signal output from power amplifier 414 through variable amplifier 418 to mixer 419, connected to synthesizer 417, where the signal is down-converted (e.g., to baseband) and split into two signal processing chains. The signals are passed through low-pass filters 420 and 421 to variable amplifiers 422 and 423, respectively. The signals are digitized by a second set of ADC converters (424 and 425) and processed by DSP 402 to compare them to the reference signal (REF) output signal. Variances in the signals are identified and errors (typically attributable to the PA) between the input and output signals are minimized by an adaptive digital pre-distortion correction which adapts for any PA. In another embodiment, the feedback is also used for other applications including built-in self-tests.

Outdoor point-to-point communications unit 400 further includes receiver 430 for receiving communications signals from other nodes in the P2P network. Other node transmissions are received by outdoor point-to-point communications unit 400 through antenna 416 coupled to receiver 430. Antenna 416 receives the communications signals and passes them through wide band low-pass filter 431 of diplexer 426. The filtered signals are passed to a series of variable amplifiers 432, 433 and 434 and then to mixer 435, coupled to synthesizer 436, for down-conversion of the received signal to lower frequency signals (e.g., baseband). The down-converted signals are passed from the mixer through two processing chains. A first processing chain includes baseband low-pass filter 437 and a pair of variable amplifiers 439 and 440. A second processing chain includes baseband low-pass filter 438 and a pair of variable amplifiers 441 and 442. The amplified signals are passed from receiver 430 through a third set of converters (443 and 444) that are coupled to the DSP.

In one embodiment, the received communication signal does not rely only on ADC digital rejection but is also assisted by selecting low-pass filters (437 and 438) to be narrow band analog high-rejection low-pass filters. For example, the low-pass filters are configured to the operational signal bandwidth to maintain data flow from the received signal resulting in immunity to out-of-band interferers. In this embodiment, coupling of the received signal is passed to a fourth set of converters 445 and 446 through bypass paths 447 and 448, respectively, thus bypassing low-pass filters 437 and 438. The bypassing of the receiver low-pass filters allows capturing out-of-band signals by the DSP comparing the narrow filtered communication signals (third converter set) and the unfiltered bypass communication signals (fourth converter set). The discovered out-of-band interferers are stored in memory 447 and can be sent to remote operators for diagnostics. This configuration provides a robust data path as well as wide spectral capturing without interrupting normal operation.

Figure 5:
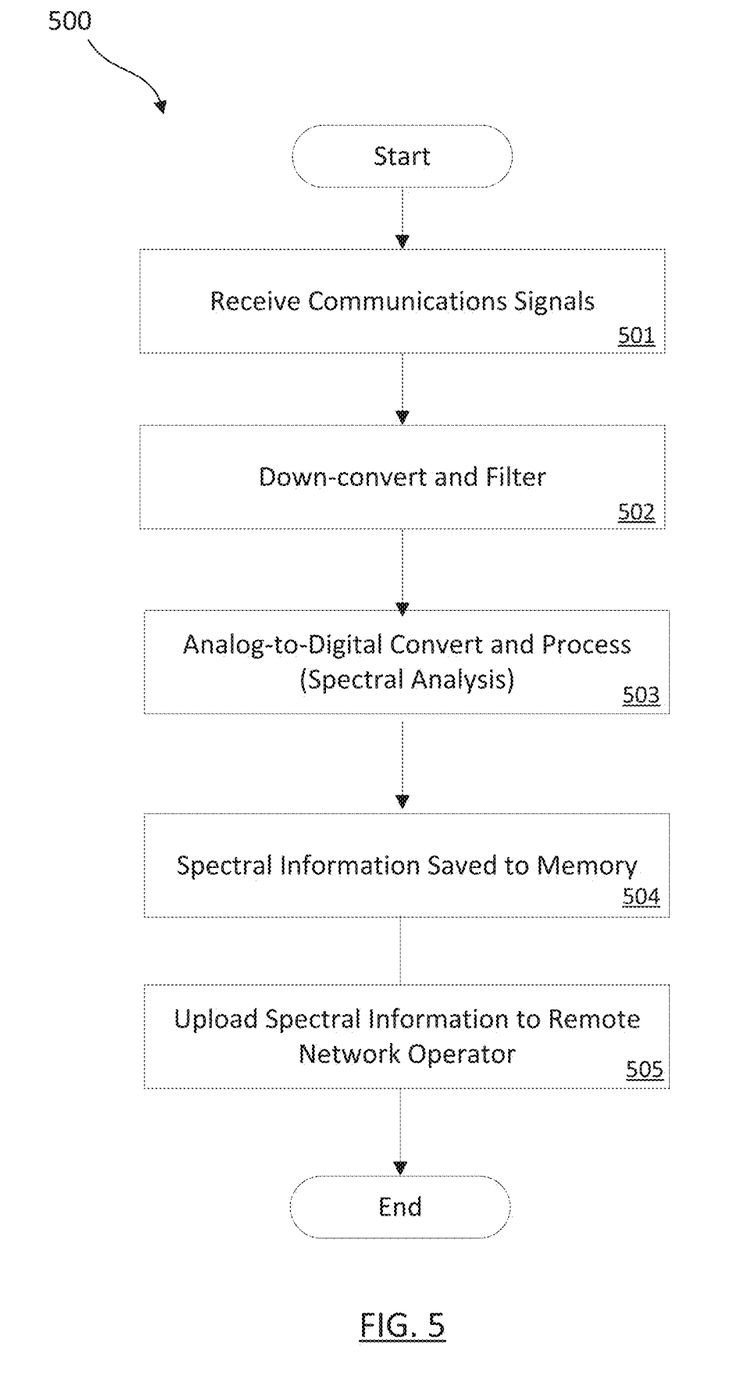
FIG. 5 illustrates a spectrum analysis flow diagram showing one embodiment of in accordance with the present disclosure.

FIG. 5 illustrates a spectrum analysis flow diagram showing one embodiment 500 in accordance with the present disclosure. In step 501, communications signals are received by an antenna of a receiver. In step 502, the received communications signals are passed through a wide band low-pass filter, amplified, down-converted, passed through wide band baseband low-pass filters and amplified again. In step 503, the amplified communications signals are passed to high speed wide band analog-to-digital converters to the DSP for processing (to include spectral analysis). In step 504, spectral information is detected (captured) in the converted communication signals and uploaded (dumped) to memory. In one embodiment of step 504, the digital signal processor processes the converted communications signals (e.g., using a digital FFT (Fast Fourier Transform)), aggregates and stores in the memory the processed spectral information, including out-of-band interferers (as determined by the spectral analysis) over time and, in step 505, uploads one or more spectral readings at a later time upon request or automatically (e.g., periodically each hour, day, week, month, etc.) to a remote network operator for diagnostics and display.

Figure 6:
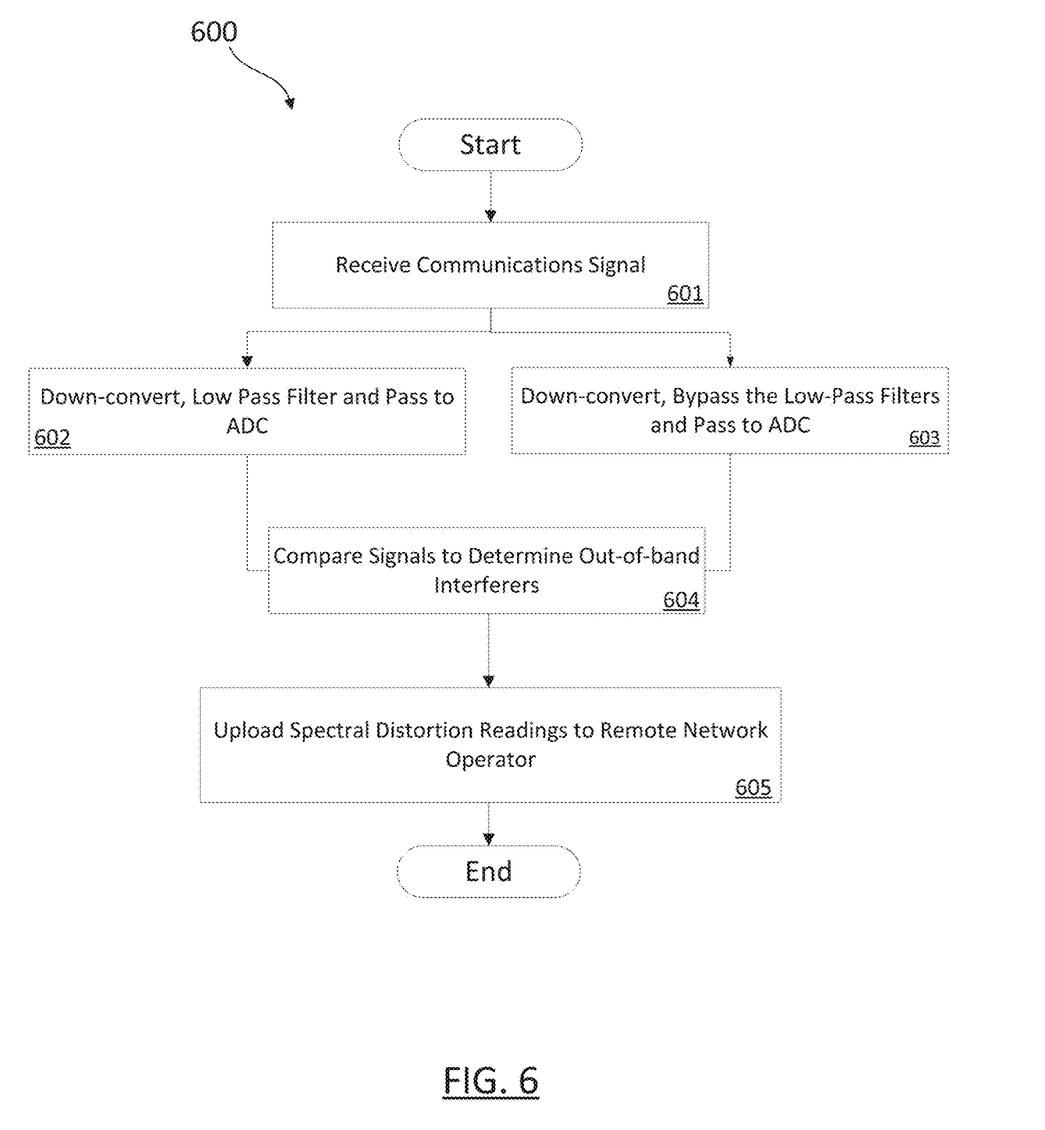
FIG. 6 illustrates a spectrum analysis flow diagram showing another embodiment in accordance with the present disclosure.

FIG. 6 illustrates a spectrum analysis flow diagram showing another embodiment 600 in accordance with the present disclosure. In step 601, communications signals are received by an antenna of a receiver. In step 602, the received communications signals are passed through a low-pass filter, amplified, down-converted, passed through narrow band (desired operational communications signal's bandwidth) baseband low-pass filters, amplified again and passed to analog-to-digital converters to the DSP for processing. In parallel with step 602, in step 603, in one or more separate processing paths, the down-converted communication signals bypass the narrow band baseband low-pass filters (as shown in FIG. 4) where they are converted from analog to digital and passed to the DSP. In step 604, the bypass communications signals are input to the DSP for spectrum analysis of out-of-band interferers (captured) by comparison and processing (e.g., using a digital FFT (Fast Fourier Transform)) to the fully filtered signals (step 602). In step 605, the spectrum analysis is stored in memory and can be sent to remote operators for diagnostics and display. In one embodiment, the digital signal processor, which includes memory, aggregates and stores in the memory the distortion readings (as detected in spectrum analysis) and uploads one or more spectral readings at a later time upon request or automatically (e.g., periodically each hour, day, week, month, etc.) to a remote network operator for diagnostics and display.

As previously discussed, the comparative advantages of the technology described herein include, but are not limited to: providing for both local and remote spectrum analysis and spectrum diagnosis without interruption in the point-to-point communications network. The spectrum analyzer combines the functionality of multiple application specific standard products (ASSP) into a single, integrated communications unit. Point-to-point network operators are provided with the ability to monitor and/or diagnose spectral information without having to terminate normal operation. Signals are processed, e.g., using a digital FFT (Fast Fourier Transform), and the details are available for display.

Throughout the specification, drawings and claims various terminology is used to describe the one or more embodiments. As may also be used herein, the terms "signals" and "communications signals" are considered equivalent. As may also be used herein, the terms "processing module", "processing circuit", "processor" and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The technology as described herein has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed technology described herein. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed technology described herein. One of average skill in the art will also recognize that the functional building blocks, and other illustrative blocks, modules and components herein, can be implemented as illustrated or by discrete components, application specific integrated circuits, processors executing appropriate software and the like or any combination thereof.

The technology as described herein may have also been described, at least in part, in terms of one or more embodiments. An embodiment of the technology as described herein is used herein to illustrate an aspect thereof, a feature thereof, a concept thereof, and/or an example thereof. A physical embodiment of an apparatus, an article of manufacture, a machine, and/or of a process that embodies the technology described herein may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the technology as described herein have been expressly described herein, other combinations of these features and functions are likewise possible. The technology as described herein is not limited by the particular examples disclosed herein and expressly incorporates these other combinations.

The invention claimed is:

1. A point-to-point communications unit, comprising:
    a microwave transmitter operable to generate outgoing microwave communication signals in a selected operational bandwidth;
    a microwave receiver comprising a first receiver path and a second receiver path, wherein the first receiver path and the second receiver path each comprise two channels, the first receiver path comprising a wide band low-pass filter configured to capture incoming microwave communication signals and distortion in adjacent frequencies, the second receiver path comprising a two-channel analog low-pass filter;
    a microwave antenna operable to transmit outgoing microwave communication signals and operable to receive incoming microwave communication signals as line of sight communication signals; and
    a digital spectrum analyzer configured to determine distortion, wherein the distortion is generated by out-of-band interferers associated with incoming microwave communication signals, and wherein the distortion is generated by non-linearities in a transmit path while maintaining the incoming line of sight communications signals, and wherein the out-of-band interferers are determined according to the captured incoming microwave communication signals in the second receiver path and incoming microwave communication signals in the first receiver path that bypass a two-channel analog band low-pass filter.

2. The point-to-point communications unit of claim 1, wherein the microwave receiver is a direct-conversion microwave receiver.

3. The point-to-point communications unit of claim 2, comprising one or more wide band high speed converters operatively coupled to the two-channel analog low-pass filter and the digital spectrum analyzer, the digital spectrum analyzer being configured to determine spectral information output from the one or more wide band high speed converters and the two-channel analog low-pass filter.

4. The point-to-point communications unit of claim 3, wherein the digital spectrum analyzer is configured to process the spectral information.

5. The point-to-point communications unit of claim 4, wherein the digital spectrum analyzer is configured to process the spectral information by digital Fast Fourier Transformation (FFT).

6. The point-to-point communications unit of claim 3, wherein the digital spectrum analyzer comprises a memory and is configured to store the spectral information as data.

7. The point-to-point communications unit of claim 6, wherein the digital spectrum analyzer is configured to provide the stored data to a remote network operator.

8. A method performed within a point-to-point communications unit, the method comprising:
    transmitting outgoing microwave communications signals, wherein distortion is generated, in part, by non-linearities in a transmit path;
    using a digital spectrum analyzer to determine the distortion generated by the non-linearities in the transmit path;
    receiving incoming microwave communications signals;
    capturing, via a two-channel low-pass filter, a portion of the incoming microwave communications signals;
    capturing, prior to the two-channel low-pass filter, wide spectral signals comprising distortion generated by out-of-band interferers;
    using the digital spectrum analyzer to determine the distortion generated by the out-of-band interferers;
    converting the wide spectral signals with high speed wide band converters to capture spectral information; and
    processing and storing the captured spectral information as data without terminating line of sight microwave communication signals.

9. The method of claim 8, wherein the point-to-point communications unit is a point-to-point outdoor communications unit.

10. The method of claim 8, wherein the point-to-point communications unit is a microwave point-to-point outdoor communications unit.

11. The method of claim 8, wherein the processing is performed by the digital spectrum analyzer, and wherein the digital spectrum analyzer is configured to provide the captured spectral information to a remote network operator.

12. An outdoor point-to-point communications unit comprising:
    a digital spectrum analyzer;
    a microwave transmitter operatively coupled to the digital spectrum analyzer, the microwave transmitter being operable to generate outgoing microwave communication signals;
    a microwave receiver operatively coupled to the digital spectrum analyzer, the microwave receiver being operable to receive incoming microwave communication signals, the microwave receiver comprising one or more receiver paths, wherein a wide band low-pass filter in a first receiver path of the one or more receiver paths is configured to capture wide spectral signals comprising distortion in adjacent frequencies, wherein at least the first receiver path of the one or more receiver paths comprises two channels, and wherein the digital spectrum analyzer is configured to determine non-linearities that produce distortion outside a selected operational bandwidth of outgoing microwave communication signals, wherein the distortion is generated, in part, by non-linearities in a transmit path;
    a microwave antenna operable to transmit outgoing microwave communication signals and operable to receive incoming microwave communication signals as line of sight communication signals; and
    the digital spectrum analyzer configured to process the received incoming microwave communication signals, while maintaining the line of sight communication signals, to determine spectral information associated with out-of-band interferers of the wide spectral signals of incoming microwave communication signals, wherein the out-of-band interferers are determined according to the captured wide spectral signals and incoming microwave communication signals that bypass a two-channel analog low-pass filter.

13. The outdoor point-to-point communications unit of claim 12, wherein the microwave receiver is a direct-conversion receiver and comprises one or more wide band high speed converters operatively connected to the two-channel analog low-pass filter configured to capture the spectral information output from the two-channel analog low-pass filter.

14. The outdoor point-to-point communications unit of claim 12, wherein the microwave receiver is a direct-conversion receiver and comprises one or more second receiver paths and the digital spectrum analyzer is configured to process the one or more second receiver signal paths to capture the spectral information.

15. The outdoor point-to-point communications unit of claim 12, comprising an adaptive digital pre-distortion feedback loop for the microwave transmitter.

16. The outdoor point-to-point communications unit of claim 12, wherein the digital spectrum analyzer comprises a memory and the digital spectrum analyzer is configured to process and store, in the memory, the spectral information as data.

17. The outdoor point-to-point communications unit of claim 16, wherein the digital spectrum analyzer is configured to provide the stored data to a remote network operator.

18. The outdoor point-to-point communications unit of claim 15, wherein the adaptive digital pre-distortion feedback loop for the microwave transmitter comprises a pre-amplified reference signal compared against a post-amplified signal.

* * * * *